United States Patent [19]
Sartori et al.

[11] Patent Number: 5,247,028
[45] Date of Patent: Sep. 21, 1993

[54] HALOGENATED POLYCARBOSILANES AND PROCESSES FOR PREPARING THEM

[75] Inventors: Peter Sartori, Rheinberg; Wolfgang Habel, Duesseldorf; Lutz Mayer, Duisburg, all of Fed. Rep. of Germany

[73] Assignee: Kali-Chemie AG, Hanover, Fed. Rep. of Germany

[21] Appl. No.: 878,622

[22] Filed: May 5, 1992

Related U.S. Application Data

[62] Division of Ser. No. 531,776, Jun. 1, 1990, Pat. No. 5,132,375.

[30] Foreign Application Priority Data

Jun. 1, 1989 [DE] Fed. Rep. of Germany ....... 3917838

[51] Int. Cl.⁵ .................. C08G 77/60; C08G 77/42
[52] U.S. Cl. .................. 525/474; 556/465; 556/476; 556/477; 528/42
[58] Field of Search .............. 525/474; 556/465, 476, 556/477; 528/42

[56] References Cited

U.S. PATENT DOCUMENTS

| | | | |
|---|---|---|---|
| 3,187,031 | 6/1965 | Weyenberg | 260/448.2 |
| 4,052,430 | 10/1977 | Yajima et al. | 528/32 |
| 4,377,677 | 3/1983 | Iwai et al. | 528/35 |
| 4,761,458 | 8/1988 | Burns et al. | 525/474 |

FOREIGN PATENT DOCUMENTS 3616378 11/1987 Fed. Rep. of Germany .
3841348  6/1990 Fed. Rep. of Germany .

*Primary Examiner*—John C. Bleutge
*Assistant Examiner*—Margaret W. Glass
*Attorney, Agent, or Firm*—Evenson, McKeown, Edwards & Lenahan

[57] ABSTRACT

Halogenated polycarbosilanes with uniform or mixed halogenation prepared from aryl-substituted, particularly phenyl-substituted polycarbosilanes by reaction with halogenating reagents under polar or ionic reaction conditions, optionally in the presence of a Lewis acid catalyst. The halogen atom introduced can optionally subsequently be replaced by another halogen atom through a transhalogenation reaction.

23 Claims, No Drawings

HALOGENATED POLYCARBOSILANES AND PROCESSES FOR PREPARING THEM

This application is a division of application Ser. No. 07/531,776, filed Jun. 1, 1990, now U.S. Pat. No. 5,132,375.

BACKGROUND OF THE INVENTION

The present invention relates to novel halogenated polycarbosilanes and to processes for their preparation.

Polycarbosilanes are polymers having a skeletal structure formed of the elements carbon and silicon in which, in general, Si groups and hydrocarbon groups are alternatingly present. The skeletal structure of such polycarbosilanes is composed, for example, of repeating structural units corresponding to the formula

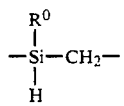

wherein $R^0$ represents, for example, a hydrocarbon substituent. According to known preparation processes, such polycarbosilanes are obtained by converting monosilanes such as, for example, tetramethylsilane, trimethylchlorosilane, dimethyldichlorosilane or methyltrichlorosilane into mixtures of different polycarbosilanes by thermal decomposition. Another known process for preparing such polycarbosilanes starts from polysilanes in which at least one of the two substituents on the silicon atom is a methyl group. These polysilanes are converted pyrolytically into the polycarbosilane at temperatures of 350° to 450° C., methylene groups, which are each inserted between adjacent Si atoms of the polysilane, being formed from a part of the methyl substituents during the thermal conversion, and a hydrogen atom remaining on the silicon atom. Such pyrolyses are radical processes.

U.S. Pat. No. 4,761,458 discloses converting such polycarbosilanes, which carry at least 0.1% by weight of SiH groups, into chlorinated or brominated polycarbosilanes by reaction with chlorinating or brominating reagents in a radical reaction. In this process, SiCl or SiBr groups are formed from the SiH groups. This patent employs, as starting materials for the halogenation reaction, ordinary polycarbosilanes of the above-described type which are known in the prior art and are substituted with lower alkyl groups. These were prepared by pyrolysis, for example, of polydimethylsilane $(-(CH_3)_2Si-)_n$.

Prepolymers which are composed of ceramic forming elements for the preparation of ceramic polymeric materials and in which readily detachable elements were in part replaced by elements detachable with difficulty such as fluorine or fully fluorinated hydrocarbon compounds, are disclosed in German published application No. DE 3,616,378. In this German application, hydrogen is named as a readily detachable element. The illustrative embodiment of this German application likewise starts from an ordinary polycarbosilane of the above-described type which is known in the prior art and which was prepared by pyrolysis of polydimethylsilane $(-(CH_3)_2Si-)_n$. Fluorine is introduced into this polycarbosilane by electrofluorination with tetraethylammonium fluoride or by direct fluorination (by radical means) with elemental fluorine. In this case, in addition to the conversion of SiH groups into SiF groups fluorine atoms are also introduced into the methyl substituents of the silicon atoms and into the methylene bridges of the Si—$CH_2$—Si skeleton of the polycarbosilane.

A number of disadvantages exist with regard to the product properties and the preparation process for these halogenated polycarbosilanes known in the prior art, i.e. halogenated polycarbosilanes prepared by radical halogenation methods from pyrolytically obtained polycarbosilane starting materials.

In part, the disadvantageous properties of the known halogenated polycarbosilanes are to be attributed to the unfavorable properties of the pyrolytically obtained unhalogenated polycarbosilanes to the extent that their use as starting materials essentially already predetermines the basic structure and the maximum achievable degree of purity of the halogenated products. Thus, for example, the ability to introduce halogen atoms into these polycarbosilanes depends directly on the SiH groups present in these polycarbosilanes since these SiH groups are converted into the SiHal groups (Hal=halogen) in the known processes for preparing halogenated polycarbosilanes. In this connection, however, it is disadvantageous that the formation of the SiH groups in the pyrolytic preparation of the polycarbosilane starting material can be controlled only with difficulty and this fact consequently directly affects also the properties of the halogenated polycarbosilanes prepared therefrom.

Furthermore, the preparation of the known halogenated polycarbosilanes under radical halogenation conditions also entails disadvantages. Thus, the degree and position of halogenation can be controlled with difficulty. Although the SiH groups first react preferentially to form SiHal groups, side reactions come about to a substantial extent, in particular with long reaction times and under slightly more severe reaction conditions. Thus, in addition to the desired halogenation in the SiH groups, halogenation reactions also occur in the hydrocarbon substituents (for example, formation of $CH_2F$—, $CHF_2$— and $CF_3$— from methyl substituents) or in the methylene bridges (for example, formation of Si—CHF—Si or Si—$CF_2$—Si) of the polycarbosilane employed. In addition, the radical reaction conditions may also result in cleavage reactions in the Si—C—Si skeleton of the polycarbosilane, as a result of which the polycarbosilane employed and/or the halogenated polycarbosilane is partially decomposed into undesirable fragments or even into more or less readily volatile, low molecular weight compounds.

On the one hand, the halogenated polycarbosilanes known in the prior art consequently are nonuniform products which have irregular Si—C skeletons just like the basic unhalogenated polycarbosilanes and which are accompanied by more or less readily volatile decomposition products due to the manner in which they are prepared. On the other hand, further measures for the purpose of restriction to a product spectrum more favorable for an intended use (for example, purification and/or separation by fractional crystallization or fractional distillation) are labor- and energy-intensive and consequently are also costly.

SUMMARY OF THE INVENTION

It is therefore the object of the present invention to provide halogenated polycarbosilanes which avoid the disadvantages of the prior art.

Another object of the invention is to provide halogenated polycarbosilanes which are distinguished by favorable properties and which can readily be optimally adapted to particular intended uses.

A further object of the invention is to provide simple and satisfactorily controllable processes for preparing these novel halogenated polycarbosilanes.

These and other objects of the invention are achieved by providing a halogenated polycarbosilane composed of structural units corresponding to the general formulae I or I and II

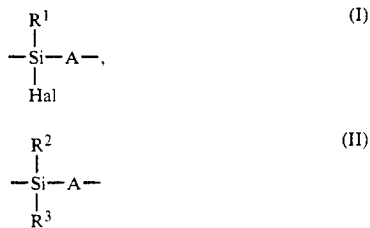

wherein

Hal represents halogen, where Hal may have the same or different meanings in different units of one and the same polycarbosilane;

$R^1$ represents halogen, alkyl, cycloalkyl, arylalkyl or aryl, where $R^1$ may have the same or different meanings in different units of one and the same polycarbosilane;

$R^2$ and $R^3$, independently of each other, represent alkyl, cycloalkyl, arylalkyl or aryl, where $R^2$ or $R^3$ may each have the same or different meanings in different units of one and the same polycarbosilane, and A represents straight-chain or branched alkylene or cycloalkylene radicals which may optionally be further substituted by inert substituents, where A may have the same or different meanings in different units of one and the same polycarbosilane;

with the proviso that in the cases of exclusively chlorinated or exclusively brominated polycarbosilanes, at least 1% by weight of aryl substituents are still present in the polycarbosilanes.

In a particularly perferred embodiment of the invention Hal represents chlorine, bromine or fluorine, most preferably fluorine.

According to a further aspect of the invention, the objects are achieved by providing a process for preparing halogenated polycarbosilanes according to Claim 1, wherein polycarbosilanes which contain structural units corresponding to the formula V

wherein $R^4$ represents alkyl, cycloalkyl, arylalkyl or aryl, where $R^4$ may also have different meanings in different units of one and the same polycarbosilane, and $R^5$ represents aryl, where $R^5$ may also represent different aryl radicals in different units of one and the same polycarbosilane, are reacted with at least one halogenating reagent under polar or ionic reaction conditions in a manner such that the aryl substituents contained in the structural units of formula V are at least partially replaced by halogen atoms.

In a variant embodiment of the invention the product of the reaction halogens introduced into the polycarbosilane in the reaction with said halogenating reagent are partly or completely replaced by another halogen atom under polar or ionic reaction conditions.

DETAILED DESCRIPTION OF PREFERRED EMBODIMENTS

The invention relates to halogenated polycarbosilanes composed of structural units corresponding to formula I or to formulas I and II

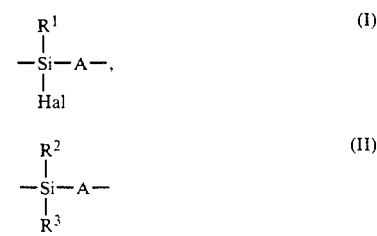

wherein

Hal represents halogen, preferably fluorine, chlorine or bromine, where Hal may also have different meanings in different units of one and the same polycarbosilane, $R^1$ represents halogen, preferably fluorine, chlorine or bromine, alkyl, cycloalkyl, arylalkyl or aryl, where R: may also have different meaning in different units of one and the same polycarbosilane, $R^2$ and $R^3$, independently of each other, represent alkyl, cycloalkyl, arylalkyl or aryl, where $R^2$ or $R^3$ may also have different meaning in different units of one and the same polycarbosilane, A represents straight-chain or branched alkylene or for cycloalkylene radicals which may optionally be further substituted by inert substituents, where A may also have different meaning in different units of one and the same polycarbosilane, and with the proviso that in the cases of exclusively chlorinated or exclusively brominated polycarbosilanes, at least 1% by weight of aryl substituents are still present in the polycarbosilanes.

The structural units of the formulae I and II are present in the polycarbosilane in general in a mean molar ratio (I:II) of 1:99 to 1:0, preferably 1:9 to 1:0. The structural unit of the formula I is consequently present in a proportion of 1 to 100 mole %, preferably of 10 to 100 mole %, and the structural unit of the formula II in a proportion of 0 to 99 mole %, preferably of 0 to 90 mole % (based oh the sum of I and II as 100 mole % without allowing for the percentage molar proportion of the terminal groups of the polycarbosilane). If aryl substituents are present in the halogenated polycarbosilanes such as, for example, in the case of the exclusively chlorinated or exclusively brominated polycarbosilanes, these can readily be detected by spectroscopic standard methods such as infrared spectroscopy (for example, aromatic C—H stretching vibrations at about 3,000-3,100 cm$^{-1}$; for example, aromatic C—C stretching vibrations at about 1,400-1,500 cm$^{-1}$) or proton resonance spectroscopy (for example, resonances of aromatic protons at about 78 ppm).

The halogenated polycarbosilanes of the present invention are halogenated derivatives of those polycarbosilanes which were prepared by a non-pyrolytic process such as is described, for example, in German Patent Application No. DE 3,841,348.

In a preferred embodiment of the invention, the polycarbosilanes are composed of a number of different structural units of the general formulae I or I and II which are present side by side. These structural units may differ in the radicals A and/or the substituents Hal and/or $R^1$ or the substituents $R^2$ and/or $R^3$. Normally, the structural units of the general formulae I or I and II forming the polycarbosilane are combinations of not more than a maximum of seven differently substituted Si units and of not more than a maximum of three different A units.

The invention also comprises polycarbosilanes with mixed halogenation, that is to say, those polycarbosilanes in which, in particular, the halogen atoms chlorine, bromine and/or fluorine can be present side by side.

Another embodiment of the invention relates to halogenated polycarbosilanes with particularly favorable properties in which at least a part of the halogen atoms are fluorine atoms. Fluorinated polycarbosilanes composed of structural units of the general formulae I or I and II are then, for example, present in which Hal represents fluorine in the structural elements of the general formula I and the other radicals A, $R^1$, $R^2$ and $R^3$ have the above meaning in the structural elements of the general formulae I and II.

A subvariant of the fluorinated polycarbosilanes is characterized by the fact that, in the structural element of the formula I in which Hal represents fluorine, the substituent $R^1$ also has the meaning halogen and preferably represents fluorine, chlorine or bromine, the other radicals A, $R^2$ and $R^3$ having the above meaning in the structural elements of the formulae I and II.

In another subvariant of the fluorinated polycarbosilanes, the latter are characterized by the fact that, in the structural elements of the formula I in which Hal represents fluorine, $R^1$ represents alkyl, cycloalkyl, arylalkyl and/or aryl and the other radicals A, $R^2$ and $R^3$ have the above meaning in the structural elements of the formula I or II. Fluorinated polycarbosilanes are then present which contain no further halogen atoms apart from the fluorine atom.

In this connection, those fluorinated polycarbosilanes are preferred in which R: represents alkyl and/or aryl, low alkyl such as methyl, ethyl, propyl or butyl radicals being very particularly preferred and phenyl radicals being very particularly preferred as aryl.

In addition to the purely fluorine-containing polycarbosilanes of the above mentioned type, the fluorinated polycarbosilanes are characterized in a further subvariant by the fact that, in the structural elements of the formula I in which Hal represents fluorine, $R^1$ also has the meaning fluorine and the other radicals A, $R^2$ and $R^3$ have the above meaning in the structural elements of the formulae I and II.

In a further embodiment of the invention, halogenated polycarbosilanes are present in which, in the structural units of the formula II, the substituents $R^2$ and $R^3$, independently of each other, have the meaning alkyl, cycloalkyl or arylalkyl and the other radicals Hal, $R^1$ and A have the above meaning in the structural units of the formula I or II. Halogenated or fluorinated polycarbosilanes are then present which may also contain aryl substituents solely in the structural units of the formula I (if $R^1$=aryl). Or halogenated or fluorinated polycarbosilanes are present which carry aryl substituents neither in the structural units of the formula I nor in the structural units of the formula II (if $R^1$=halogen, alkyl, cycloalkyl or arylalkyl).

In advantageous embodiments of the above-described halogenated or fluorinated polycarbosilanes, A has only one single meaning in all the structural units of the general formulae I and II of the polycarbosilane; those halogenated or fluorinated polycarbosilanes are then, for example, present in which the structural units of the general formulae I and II are formed by combinations of not more than seven different substituted Si units and only one A unit.

In further advantageous embodiments, each of the substituents $R^2$ and $R^3$ has in each case only one single meaning in all the structural units of the formula II of the halogenated or fluorinated polycarbosilane. Halogenated or fluorinated polycarbosilanes are then, for example, present which contain structural units of the formula II in which all the $R^2R^3Si$ units are identical.

In other advantageous embodiments, halogenated or fluorinated polycarbosilanes are present in which, in all the structural units of the general formula I, for the case where Hal=fluorine, the substituent $R^1$ has only one single meaning and for the case where Hal=halogen, each of the substituents Hal and R: in each case has only one single meaning. Halogenated or fluorinated polycarbosilanes are then, for example, present with structural units of the general formula I in which all the $R^1FSi$ or $R^1HalSi$ units are identical.

In a preferred embodiment only one single type of the structural units of the general formulae I and II is present in the polycarbosilanes according to the invention. Halogenated or fluorinated polycarbosilanes are then present in which only one single type of a structural element of the general formula I and only one single type of a structural element of the general formula II is present, A being identical in all the structural units of the formula I or II; or halogenated or fluorinated polycarbosilanes composed exclusively of units corresponding to the formula I (100 mole % units of formula I; 0 mole % units of formula II; without allowing for the molar percentage proportion of the terminal groups) are present in which the $R^1HalSi$ units and the A units are identical in all the structural units of the halogenated or fluorinated polycarbosilane.

In the polycarbosilanes according to the invention composed of the structural units of the formulae I or I and II, the substituents Hal and/or R: may represent halogen; in this case, halogen preferably has the meaning fluorine, chlorine, or bromine.

In the halogenated polycarbosilanes according to the invention composed of structural units of the formulae I or I and II, the radicals $R^1$, $R^2$ and/or $R^3$ may represent alkyl; in this case, alkyl has the meaning of a straight-chain or branched alkyl radical which may optionally be further substituted by inert radicals. Examples of suitable alkyl include methyl, ethyl, propyl, butyl, pentyl, hexyl, octyl, dodecyl, hexadecyl, isopropyl, isobutyl or tertiary butyl.

In the halogenated polycarbosilanes according to the invention composed of structural units of the formulae I or I and II, the radicals $R^1$, $R^2$ and/or $R^3$ may represent cycloalkyl. As used herein, the term "cycloalkyl" is understood to include cycloalkyl groups optionally further substituted with inert radicals. Examples of cycloalkyl include cyclopentyl and cyclohexyl.

In the halogenated polycarbosilanes according to the invention composed of the structural units of the formulae I or I and II, the radicals $R^1$, $R^2$ and/or $R^3$ may represent arylalkyl; examples of suitable arylalkyl groups include benzyl or phenylethyl.

In the halogenated polycarbosilanes according to the invention composed of the structural units of the formulae I or I and II, the radicals $R^1$, $R^2$ and/or $R^3$ may represent aryl; in this case, aryl has the meaning of an unsubstituted or inertly substituted aromatic hydrocarbon radical. Examples of suitable aryl include phenyl, naphthyl, p-diphenyl or alkylaryl radicals such as tolyl, ethylphenyl or propylphenyl. Insofar as the substituents $R^1$, $R^2$ and/or $R^3$ have the meaning aryl in the structural units of the formulae I and/or II of the halogenated or fluorinated polycarbosilanes, the phenyl radical is preferred in particular. In the structural units of the formula I phenylfluorosilylene, phenylchlorosilylene and/or phenylbromosilylene groups are then present, for example, as $R^1HalSi$ groups. In the structural units of the formula II, phenylalkylsilylene, phenylcycloalkylsilylene, phenylarylalkylsilylene and/or diphenylsilylene groups are then present, for example, as $R^2R^3Si$ groups.

A further advantageous embodiment of the invention comprises those halogenated or fluorinated polycarbosilanes composed of the structural units of the formulae I or I and II in which $R^2$ and $R^3$, independently of each other, represent lower alkyl or aryl, preferably for methyl, ethyl, propyl, butyl or phenyl. Examples of such $R^2R^3Si$ units contained in the structural units of the formula II are dimethylsilylene, diethylsilylene, dipropylsilylene, dibutylsilylene, diphenylsilylene, methylethylsilylene, methylpropylsilylene, methylbutylsilylene or methylphenylsilylene.

In the halogenated or fluorinated polycarbosilanes according to the invention composed of the structural units of the formulae I or I and II, the unit A may represent straight-chain or branched alkylene radicals or cycloalkylene radicals which may optionally be further substituted by inert substituents. $C_1$- to $C_6$- alkylene radicals such as methylene, ethylene, trimethylene, propylene, tetramethylene, pentamethylene, hexamethylene and phenyl-substituted alkylene radicals with 8 to 9 carbon atoms such as phenylethylene or 1-methyl-1-phenylethylene are advantageous; the lower alkylene radicals such as methylene, ethylene, trimethylene or propylene are preferred, particularly methylene. If, however, the unit A represents a cycloalkylene radical, cycloalkylene radicals such as cyclopentylene or cyclohexylene are advantageous.

The halogenated or fluorinated polycarbosilanes according to the invention are solid or liquid or viscous materials having a basic structure in which essentially every silicon atom is bonded, on the one hand, only to carbon atoms or, on the other hand, only to carbon and halogen atoms. These halogenated or fluorinated polycarbosilanes are distinguished accordingly by the fact that they have a Si—Si bond proportion of only a maximum of 5%. In the examples according to the invention, the Si—Si bond proportion is even below 1%.

Depending on the halogen atoms present in the molecule, the halogen content of the halogenated or fluorinated polycarbosilanes may be up to 79% by weight (only bromine as halogen), up to 63% by weight (only chlorine as halogen) or up to 48% by weight (only fluorine as halogen). In the case of the particularly preferred fluorinated polycarbosilanes, those fluorinated polycarbosilanes are useful whose fluorine content is 0.1 to 48% by weight, in particular, however, 1 to 48% by weight.

The number of the structural units which form the polycarbosilanes according to the invention lies, in general, at values between 10 and 500, preferably between 30 and 150. The halogenated or fluorinated polycarbosilanes consequently have number average molecular weights in the range from 750 to 300,000 g/mole, preferably in the range from 2,000 to 50,000 g/mole.

In a modified embodiment of the invention, the halogenated or fluorinated polycarbosilanes may contain branching groups corresponding to the formulas III and/or IV

  (III)

  (IV)

wherein
A has the above meaning and R represents halogen, alkyl, cycloalkyl, arylalkyl or aryl. As a result of the branching groups III and/or IV, the polycarbosilanes according to the invention may be up to 50% cross-linked.

The halogenated or fluorinated polycarbosilanes composed of the general structural units of the formulae I or I and II may have various terminal groups. The terminal groups may be halogen, alkyl, cycloalkyl, arylalkyl, aryl, alkoxy or hydroxy groups. Examples of suitable terminal groups include chlorine, bromine, fluorine, methyl, phenyl, methoxy or hydroxy.

The invention relates also to a process for preparing halogenated polycarbosilanes composed of the structural units of the formulae I or I and II, according to which a) polycarbosilanes which contain structural units of the general formula V

  (V)

wherein
$R^4$ represents alkyl, cycloalkyl, arylalkyl or aryl, where $R^4$ may also have different meanings in different units of one and the same polycarbosilane, and $R^5$ represents aryl, where $R^5$ may also represent different aryl radicals in different units of one and the same polycarbosilane, are reacted with at least one halogenating reagent under polar or ionic reaction conditions, preferably in the presence of a Lewis acid, in a manner such that the aryl substituents contained in the structural units of the general formula V are partially or completely replaced by halogen atoms, and b) optionally thereafter the halogen introduced into the polycarbosilane in step a) is partially or completely replaced under polar or ionic reaction conditions by another halogen atom.

To carry out this process, aryl-substituted polycarbosilanes are reacted as starting materials, optionally in the presence of a Lewis acid as catalyst, under a protective gas atmosphere in an organic solvent, which is inert under the reaction conditions, water being substantially excluded, with at least one halogenating reagent having a polar or ionic reaction for up to several hours.

As polycarbosilane starting materials, any polycarbosilane which carries aryl substituents on the silicon atoms can be used for this purpose. The phenyl group is a preferred aryl substituent. Although the polycarbosilanes which is used may be a pyrolytically produced polycarbosilane with phenyl substituents, the preferred starting materials for the preparing halogenated polycarbosilanes according to the invention are those polycarbosilanes which are produced non-pyrolytically. Suitable non-pyrolytically prepared polycarbosilanes are described, for example, in German Patent Application No. 3,841,348. They are obtained by co-condensing monomeric dihalosilanes (for example $R^4R^5SiCl_2$, optionally mixed with for example, $R^2R^3SiCl_2$) with monomeric dihalohydrocarbons (for example Cl—A—Cl etc.) in the presence of alkali metals under a protective gas in an inert organic solvent. By adding suitable branching reagents (for example, $RSiCl_3$, $SiCl_4$, etc.) polycarbosilanes containing branching groups of the formulae III and/or IV can also be obtained by such co-condensation reactions. Polycarbosilanes with specifically selected degrees of condensation can also be obtained by adding chain termination reagents (for example, $R_3SiCl$, $CH_3Cl$, etc.). Other starting material polycarbosilanes are obtained by known processes involving co-condensation of monomeric dihalosilanes with styrene derivatives in the presence of alkali metals. Such copolymers, for example of dimethyldichlorosilane and styrene, may likewise be branched by addition of suitable branching reagents such as, for example, methyltrichlorosilane. Suitable copolymeric carbosilanes composed of styrene and dimethylsilylene units are described, for example, in U.S. Pat. No. 3,187,031.

For the preparation of the halogenated polycarbosilanes according to the invention from phenyl substituted polycarbosilanes, any conventional halogenating reagent can be used which reacts in a polar or ionic manner. Halogenating reagents which react in an exclusively radical manner are therefore excluded. Suitable halogenating reagents for the reactions include hydrohalic acids such as HBr, HCl or HF; ammonium salts of these hydrohalic acids such as $NH_4Br$, $NH_4Cl$ or $NH_4F$; acidic alkali fluorides such as sodium hydrogen fluoride ($NaHF_2$ or NaF.HF) or acidic potassium fluoride such as $KF.(HF)_n$ where n = 1 to 3; hydrogen fluoride adducts of ammonium fluoride such as $NH_4F.(HF)_n$ or $NH_4F.HF$; or other halogenating reagents such as phosphorus pentachloride, antimony pentachloride, antimony trifluoride, arsenic trifluoride, titanium tetrafluoride, tin tetrafluoride, copper difluoride, zinc difluoride etc. In this connection, preferred halogenating reagents are the hydrohalic acids and their ammonium salts, the hydrogen fluoride adducts of ammonium fluoride, and the acidic alkali fluorides. Elemental halogens can also be used under polar or ionic reaction conditions. Insofar as a part of the phenyl substituents is to remain intact in the halogenated polycarbosilane, it should be kept in mind in this connection, however, that (in addition to replacing phenyl substituents with halogen atoms) an electrophilic aromatic substitution of hydrogen atoms by halogen atoms may also occur in the remaining phenyl substituents. On the other hand, such an electrophilic aromatic substitution does not take place in the phenyl substituents if the other halogenating reagents mentioned above are employed.

The polar or ionic reaction mode of the halogenating reagent is assured by the fact that the halogenating reagents which are used are, on the one hand, already compounds with an inherently polar or ionic reaction such as, for example, HCl, HF, $NH_4Cl$, $NH_4F$, $NH_4F.(HF)_n$, NaF.HF, $KF.(HF)_n$, $PCl_5$, $SbCl_5$, $SbF_3$, $AsF_3$, $TiF_4$, $SnF_4$, $CuF_2$, $ZnF_2$, etc. Or, on the other hand, if halogenating reagents are used which may have either a polar or ionic mode of reaction or a radical reaction mode (for example HBr, halogens), polar or ionic reaction conditions are ensured by carrying out the reaction in the presence of a Lewis acid catalyst. The presence of a Lewis acid catalyst also may be advantageous in reactions with halogenating reagents which inherently have polar or ionic reaction modes and which are not themselves Lewis acids, for example reactions with hydrogen chloride. Suitable Lewis acid catalysts for the process of the invention for preparing halogenated polycarbosilanes include the known electrophilic and catalytically active electron-pair acceptor compounds of halogens with the elements boron, aluminum, phosphorus, antimony, arsenic, iron, zinc or tin. Examples of suitable Lewis acid catalysts include compounds such as $BF_3$, $AlCl_3$, $AlBr_3$, $PCl_5$, $SbCl_5$, $SbF_3$, $ZnF_2$, etc.

The organic solvent in which the reactions take place may be any desired solvent which is compatible with the halogenating reagents and the optionally present Lewis acid catalysts, and in which the polycarbosilanes used as starting materials are soluble. Preferably, this organic solvent is also a solvent for the halogenated polycarbosilanes which are to be prepared according to the invention. Suitable solvents include, for example, on the one hand, hydrocarbons such as benzene, toluene, xylene or paraffins or, on the other hand, fully or partially halogenated hydrocarbons such as carbon tetrachloride, chloroform, methylene chloride, dichloroethane, fluorochlorohydrocarbons or fluorochlorohydrocarbons containing hydrogen. It is advantageous to use solvents which can easily be removed again after the reaction by distillation. The amount of the solvent may at the same time be varied within wide ranges depending on the practical requirements.

The reactions may conveniently be carried out at temperatures around room temperature (15° to 25° C.). Furthermore, the reactions are in general carried out under a suitable protective gas. Suitable protective gases include, for example, nitrogen or argon. The degree of halogenation of the products can easily be controlled during these reactions by, on the one hand, regulating the number of replaceable substituents (for example, phenyl) in the polycarbosilane starting material or, on the other hand, increasing or decreasing the reaction time and/or the amount of halogenating reagent supplied.

The reaction may generally be carried out by passing gaseous halogenating reagents through an anhydrous solution of the polycarbosilane, which solution optionally contains catalytic amounts of Lewis acid catalyst. On the other hand, if solid halogenating reagents such as, for example, acidic alkali fluorides, ammonium fluoride or ammonium fluoride-HF adducts, are used, these halogenating reagents are first introduced, optionally together with a Lewis acid catalyst, into the reaction vessel as such (for example in powdered form) or suspended in a solvent. A solution of the polycarbosilane starting material is then added dropwise.

After the reaction has taken place, the halogenated polycarbosilane can be isolated from the reaction mixture by any suitable method. If the halogenated polycarbosilane is soluble in the solvent, the other insoluble components, for example the Lewis acid catalyst optionally suspended in the solvent, can be separated out by filtration. The halogenated polycarbosilane remaining in the solvent can then optionally be subjected to further purification measures and isolated by removing the solvent. However, if the halogenated polycarbosilanes formed are insoluble in the solvent, they can be dissolved by another suitable solvent, separated out by filtration from insoluble constituents, and isolated by removing the solvent. Subsequently, the isolated products can be treated additionally in vacuo or optionally at elevated temperatures ("dried") to remove any still remaining solvent residues.

Both uniformly halogenated polycarbosilanes, i.e. those with only one type of halogen atom, and also polycarbosilanes with mixed halogenation, i.e. those with various halogen atoms, can be obtained by this process. Uniformly halogenated polycarbosilanes are obtained, for example, by reacting an unhalogenated polycarbosilane of the type described as starting compound with only one single halogenating agent. On the other hand, polycarbosilanes with mixed halogenation can also be prepared directly from the unhalogenated polycarbosilane starting material by reacting the latter simultaneously with, for example, two halogenating agents which carry different halogen atoms; for example, polycarbosilanes containing both chlorine and bromine can be obtained in this way with an HCl/HBr gas mixture. The reaction conditions are in this case analogous to the reactions with only one halogenating reagent.

It is furthermore possible to prepare uniformly halogenated polycarbosilanes starting from polycarbosilanes already halogenated with another halogen atom by complete halogen replacement; for example, chlorine or bromine atoms may advantageously be replaced by fluorine atoms in this manner. If, on the other hand, only a partial halogen replacement is carried out, a polycarbosilane with mixed halogenation is obtained as product from the uniformly halogenated polycarbosilane employed; thus, for example, polycarbosilanes containing both chlorine and fluorine can be prepared from chlorinated polycarbosilanes by partial replacement of the chlorine atoms by fluorine atoms. It is furthermore also possible to convert polycarbosilanes with mixed halogenation into other polycarbosilanes with mixed halogenation; for example, chorine- and fluorine-containing polycarbosilanes can also be prepared in this manner from chlorine and bromine-containing polycarbosilanes. In this case, the reaction can easily be controlled in a manner such that only the bromine atoms are replaced completely by fluorine atoms and the chlorine atoms, on the other hand, remain intact in the polycarbosilane. The reaction conditions for the halogen replacement reactions are in this case analogous to the conditions already described above for the halogenation reactions. As a result of this halogen replacement, it is possible to also readily obtain those halogenated polycarbosilanes which can be prepared directly (i.e. without transhalogenation) only with difficulty or only with unsatisfactory yields. The bromine atom is especially advantageous as the halogen atom which is to be replaced by another.

The invention furthermore relates to a process for preparing fluorinated polycarbosilanes, according to which polycarbosilanes which contain structural units of the general formula Ia or the general formulae Ia and IIa

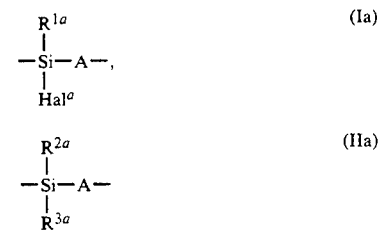

wherein
A has the meaning given above, and $R^{2a}$ and $R^{3a}$ have the meanings given for $R^2$ and $R^3$, and wherein
$R^{1a}$ represents chlorine, bromine, alkyl, cycloalkyl, arylalkyl or aryl, where $R^{1a}$ may also have different meanings in different units of one and the same polycarbosilane, and wherein
$Hal^a$ represents chlorine or bromine, where $Hal^a$ may also have different meaning in different units of one and the same polycarbosilane,
is reacted with a fluorinating reagent in a manner such that the chlorine, bromine and optionally aryl substituents contained in the polycarbosilane are partially or completely replaced by fluorine atoms.

The preparation of the fluorinated polycarbosilanes by the foregoing process is carried out in a manner analogous to the halogenation and halogen-replacement reactions already described above. The chlorinated and/or brominated polycarbosilanes according to the invention already described above, i.e. halogenated polycarbosilanes obtained by polar or ionic halogenation, in particular from non-pyrolytically prepared phenyl-substituted polycarbosilanes, are in this case preferably used as starting materials. In addition, however, known chlorinated or brominated polycarbosilanes, for example those which are disclosed in U.S. Pat. No. 4,761,458 and which are obtained by radical halogenation from pyrolytically prepared polycarbosilanes, may also be employed.

Fluorinating agents which are particularly suitable for this halogen replacement include hydrogen fluoride, ammonium fluoride or adducts of hydrogen fluoride and ammonium fluoride, acidic alkali fluorides and also $SbF_3$, $AsF_3$, $TiF_4$, $SnF_4$, $CuF_2$, $ZnF_2$, etc. The ammonium salts, for example $NH_4F\cdot(HF)_n$, $NH_4F\cdot HF$ or $NH_4F$, are preferably used, in which case it becomes superfluous to employ an additional Lewis acid catalyst. The reactions can furthermore easily be controlled in a manner such that either all the chlorine or bromine atoms contained in the starting material or only a part of the chlorine or bromine atoms contained in the starting material are replaced. In addition, only the bromine atoms can, for example, easily be partially or completely replaced in chlorine- and bromine-containing polycarbosilanes without altering the chlorine content. Thus, with complete replacement of bromine by fluorine, polycarbosilanes containing both chlorine and fluorine are obtained or with only partial replacement of the bromine atoms, polycarbosilanes with mixed halogenation and which simultaneously contain fluorine, chlorine and bromine atoms are obtained. Under more severe reaction conditions, any aryl substituents which may still be present in the polycarbosilane are also completely or partially replaced by fluorine atoms.

The halogenated or fluorinated polycarbosilanes according to the invention are distinguished by discreet properties which are determined by controlled variation of the molecular size, by the number and type of cross-linkages, by suitable selection of the groups A, $R^1$, $R^2$ and $R_3$, and also by the type and content of the halogen atoms. Of the uniformly halogenated polycarbosilanes, the chlorinated polycarbosilanes, and particularly the fluorinated polycarbosilanes, are distinguished because of their unexpectedly high stability, as a result of which they are particularly suitable for numerous applications. In the case of the polycarbosilanes with mixed halogenation, the stability of the polycarbosilanes is increased further by incorporation of a second (Br/Cl; Br/F; Cl/F) or a third halogen (Br, Cl, F). Here again chlorine-containing, and in particular fluorine-containing, products are distinguished by particularly favorable stabilities for numerous uses, while the more reactive bromine-containing products are particularly advantageous as starting materials for halogen replacement reactions and other replacement reactions. However, the uniformly fluorinated polycarbosilanes which, depending on the degree of fluorination, yield a broad spectrum of liquid, viscous and solid products, and which are stabilized to a particularly large extent by the high Si—F bonding energy have above all, particularly favorable properties. Only in the case of the chlorine- and fluorine-containing polycarbosilanes with mixed halogenation are similarly favorable chemical and physical properties achieved.

The halogenated polycarbosilanes according to the invention, and particularly the fluorinated polycarbosilanes, are suitable as valuable starting polymers for industrial preparation of high-grade silicon carbide ceramics, but are also outstandingly suitable for diverse other industrial applications, for example as binding agents or coating materials. Other possible applications include use for impregnations, fibers and other fields of use in which unhalogenated polycarbosilanes are also used.

The processes according to the invention for preparing halogenated or fluorinated polycarbosilanes are distinguished by the fact that, in contrast to prior art processes, they make it possible to prepare specifically and precisely defined, uniformly halogenated polycarbosilanes and also polycarbosilanes with mixed halogenation of any desired composition and consistency. The properties of these halogenated polycarbosilanes can be modified by these processes with respect to the type and degree of halogenation in a controlled and simple manner. As a result of this, a wide variety of halogenated polycarbosilanes are provided which can be optimally matched to a particular intended use by controlled modification.

The invention is illustrated in further detail by the following examples without, however, limiting its scope. Unless otherwise indicated, parts and percentages in the examples refer to parts by weight or weight percentages. All the reactions were carried out in standard laboratory apparatus. The prepared compounds were analyzed by elemental analysis and spectroscopic methods (NMR = nuclear magnetic resonance spectroscopy, IR = infrared spectroscopy, MS = mass spectroscopy).

Example 1

20 g of polymethylphenylcarbosilane (mean molecular weight 5,000 g/mole; elemental analysis: Si 32.18% by weight; C 58.32% by weight; H 5.90% by weight) were dissolved in 150 ml of dry benzene, and a catalytic amount of sublimed aluminum chloride (0.9 g) was added. Dry hydrogen chloride gas was then passed through this mixture over a time period of 15 hours. After termination of the reaction, the aluminum chloride catalyst was filtered out, the solvent benzene was distilled off, and the remaining residue was dried at 120° C. in vacuo. 14.1 g of a light yellow solid which was found to be a chlorinated polycarbosilane still containing phenyl groups in the IR and $^1$H-NMR spectrum (proton nuclear magnetic resonance spectrum: 7.3 ppm) were obtained. The elemental analysis for this chlorinated polycarbosilane yielded the following composition: Cl 28.4% by weight; Si 33.5% by weight; C 31.97% by weight, H 5.01% by weight. The IR spectrum (KBr) had the following characteristic bands (in $cm^{-1}$): 3068 (C—H stretching vibration of the phenyl groups), 3011 (weak), 2957 (C—H stretching vibration $CH_3/CH_2$), 2895, 1427 (C—C stretching vibration of the phenyl groups), 1404 ($CH_2$ deformation vibration of the Si—$CH_3$), 1355 ($CH_2$ deformation vibration of the Si—$CH_2$—Si), 1027 ($CH_2$ of the Si—$CH_2$—Si; broad).

Example 2

20 g of polymethylphenylcarbosilane (as in Example 1) were dissolved in 150 ml of dry benzene, and a catalytic amount of aluminum bromide (1 g) was added. Dry hydrogen bromide gas was then passed through this mixture over a time period of 15 hours. After termination of the reaction, the aluminum bromide catalyst was filtered out, the solvent benzene was distilled off, and the remaining residue was dried at 150° C. in vacuo. 13.0 g of a yellowish brown solid were obtained which was found to be a brominated polycarbosilane containing phenyl groups in the IR and $^1$H-NMR spectrum. The elemental analysis of this brominated polycarbosilane yielded the following composition: Br 46.3% by weight; Si 31.7% by weight; C 18.04% by weight; H 3.2% by weight.

Example 3

20 g of polymethylphenylcarbosilane (as in Example 1) were dissolved in 150 ml of dry benzene and a catalytic amount of sublimed aluminum chloride (0.9 g) was added. Dry hydrogen chloride gas was then passed through this mixture over a time period of 15 hours, and subsequently dry hydrogen bromide gas over a time period of a further 7 hours. After termination of the reaction, the aluminum chloride catalyst was filtered out, the solvent benzene was distilled off, and the remaining residue dried in vacuo at 120° C. 12 g of a yellow solid were obtained which was found to be a chlorine- and bromine-containing polycarbosilane still containing phenyl groups in the IR and $^1$H-NMR spectrum. The elemental analysis for this chlorine- and bromine-containing polycarbosilane yielded the following composition: Br 10.9% by weight; Cl 16.4% by weight; Si 32.2% by weight; C 32.8% by weight; H 5.2% by weight.

Example 4

A solution of 10 g of the chlorinated polycarbosilane obtained in Example 1 in 150 ml of chloroform was added dropwise at room temperature to 3 g of ammonium fluoride (previously dried at 70° C. in vacuo) while stirring under a protective gas atmosphere. After a reaction time of 10 hours, the ammonium salts were filtered out, the solvent chloroform was distilled off, and the remaining residue was dried at 120° C. in vacuo. 8.9 g of a light yellow solid were obtained which was found to be a chlorine- and fluorine-containing polycarbosilane with the following composition according to the IR and $^1$H-NMR spectra and also by elemental analysis: F 2.5% by weight; Cl 26.2% by weight; Si 33.6% by weight; C 32.0% by weight; H 5.0% by weight.

Example 5

A solution of 10 g of the chlorinated polycarbosilane obtained in Example 1 in 150 ml of chloroform was added dropwise at room temperature to 13.2 g of $NH_4F \cdot HF$ (previously dried in vacuo at 50° C.) while stirring and under protective gas. After a reaction time of 10 hours, the ammonium salts were filtered out, the solvent chloroform was distilled off, and the remaining residue was dried at 120° C. in vacuo. 8.2 g of a yellow solid were obtained which was found to be a chlorine- and fluorine-containing polycarbosilane of the following composition according to the IR and $^1$H-NMR spectra and also by elemental analysis: F 4.7% by weight; Cl 20.6% by weight; Si 33.7% by weight; C 32.3% by weight; H 5.1% by weight.

Example 6

A solution of the chlorine- and bromine-containing polycarbosilane obtained in Example 3 in 150 ml of chloroform was added dropwise at room temperature to 10 g of $NH_4F \cdot HF$ (previously dried in vacuo at 50° C.) while stirring and under protective gas. After a reaction time of 12 hours, the ammonium salts were filtered out, the solvent chloroform was distilled off, and the remaining residue was dried at 100° C. in vacuo. 3.6 g of a reddish-yellow solid were obtained which was found to be a chlorine- and fluorine-containing polycarbosilane with the following halogen contents according to the IR and $^1$H-NMR spectra and also by elemental analysis: F 10.9% by weight; Cl 3.7% by weight.

Example 7

A solution of 10 g of the brominated polycarbosilane obtained in Example 2 in 150 ml of chloroform was added dropwise at room temperature to 10 g of ammonium fluoride (previously dried in vacuo at 70° C.) while stirring under a protective gas atmosphere. After a reaction time of 12 hours, the ammonium salts were filtered out, the solvent chloroform was distilled off, and the remaining residue was dried at room temperature in vacuo. 2.5 g of a whitish-yellow solid were obtained which was found to be a fluorinated polycarbosilane with a fluorine content of 17.5% by weight according to the IR and $^1$H-NMR spectra and also by elemental analysis.

Example 8

20 g of polydiphenylcarbosilane (elemental analysis: Si 14.2% by weight; C 79.61% by weight; H 6.14% by weight) were dissolved in 150 ml of dry benzene, and a catalytic amount of aluminum bromide (1 g) was added. Dry hydrogen bromide gas was then passed through this mixture over a time period of 5 hours. After termination of the reaction, the aluminum bromide catalyst was filtered out, the solvent benzene was distilled off, and the remaining residue was dried in vacuo at 50° C. 17.7 g of a viscose, reddish-brown product were obtained which was found to be a highly brominated polycarbosilane still containing phenyl groups according to the IR and $^1$H-NMR spectra. The elemental analysis for this brominated polycarbosilane yielded the following composition: Br 66.2% by weight; Si 13.6% by weight; C 18.0% by weight; H 2.0% by weight.

The foregoing description and examples have been set forth merely to illustrate the invention and are not intended to be limiting. Since modifications of the described embodiments incorporating the spirit and substance of the invention may occur to persons skilled in the art, the scope of the invention should be construed to include all modifications falling within the ambit of the appended claims and equivalents thereof.

What is claimed is:

1. A halogenated polycarbosilane composed of structural units corresponding to the general formulae I or I and II

wherein

Hal represents fluorine;

$R^1$ represents halogen, alkyl, cycloalkyl, arylalkyl or aryl, where $R^1$ may have the same or different meanings in different units of the same polycarbosilane;

$R^2$ and $R^3$, independently of each other, represent alkyl, cycloalkyl, arylalkyl or aryl, where $R^2$ or $R^3$ may each have the same or different meanings in different units of the same polycarbosilane, and A represents straight-chain or branched alkylene or cycloalkylene radicals which may optionally be further substituted by inert substituents, where A may have the same or different meanings in different units of the same polycarbosilane;

with the proviso that in the cases of exclusively chlorinated or exclusively brominated polycarbosilanes, at least 1% by weight of aryl substituents are still present in the polycarbosilanes.

2. A polycarbosilane according to claim 1, wherein $R^1$ represents alkyl, cycloalkyl, arylalkyl or aryl.

3. A polycarbosilane according to claim 1, wherein $R^1$ represents halogen.

4. A polycarbosilane according to claim 3, wherein $R^1$ represents fluorine, chlorine or bromine.

5. A polycarbosilane according to claim 4, wherein $R^1$ represents fluorine.

6. A polycarbosilane according to claim 1, composed of units of the formulae I and II, wherein $R^2$ and $R^3$ are each independently selected from the group consisting of alkyl, cycloalkyl and arylalkyl radicals.

7. A polycarbosilane according to claim 1, composed of units of the formulae I and II, wherein each of the substituents $R^2$ and $R^3$ has only a single meaning in all the structural units of formula II of the polycarbosilane.

8. A polycarbosilane according to claim 1, wherein A has only a single meaning in all the structural units of the formulae I and II of the polycarbosilane.

9. A polycarbosilane according to claim 1, wherein $R^1$ has only a single meaning in all structural units of formula I.

10. A polycarbosilane according to claim 1, wherein $R^1$ has only a single meaning in all structural units of formula I.

11. A polycarbosilane according to claim 1, wherein $R^2$ and $R^3$, independently of each other, each represent a lower alkyl or aryl radical.

12. A polycarbosilane according to claim 11, wherein $R^2$ and $R_3$ are each independently selected from the group consisting of methyl, ethyl, propyl, butyl and phenyl radicals.

13. A polycarbosilane according to claim 1, wherein A represents a straight-chain or branched $C_1$- to $C_6$-alkylene group or a phenyl-substituted alkylene group with a total of 8 or 9 carbon atoms.

14. A polycarbosilane according to claim 13, wherein A is selected from the group consisting of methylene, ethylene, trimethylene, propylene, phenylethylene and 1-methyl-1-phenylethylene groups.

15. A polycarbosilane according to claim 14, wherein A represents a methylene group.

16. A polycarbosilane according to claim 1, wherein said cycloalkylene radicals are selected from the group consisting of cyclopentylene and cyclohexylene radicals.

17. A polycarbosilane according to claim 1, having a fluorine content in the range from 0.1 to 48% by weight.

18. A polycarbosilane according to claim 17, having a fluorine content in the range from 1 to 48% by weight.

19. A polycarbosilane according to claim 1, having a total of from 10 to 500 structural units of formulae I and II in each polycarbosilane molecule.

20. A polycarbosilane according to claim 19, having a total of from 30 to 150 structural units of formulae I and II in each polycarbosilane molecule.

21. A polycarbosilane according to claim 1, having a number average molecular weight in the range from 750 to 300,000 g/mole.

22. A modified polycarbosilane according to claim 1, further comprising branching groups corresponding to at least one of the formulae III and IV

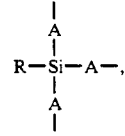

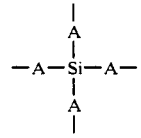

wherein
A has the meaning given in claim 1, and R represents halogen, alkyl, cycloalkyl, arylalkyl, or aryl.

23. A polycarbosilane according to claim 1, comprising terminal groups selected from the group consisting of halogen, alkyl, cycloalkyl, arylalkyl, aryl, alkoxy and hydroxy groups.

* * * * *